United States Patent [19]

Kumatani et al.

[11] Patent Number: 4,691,588

[45] Date of Patent: Sep. 8, 1987

[54] LEVER MECHANISM IN COMBINATION WITH A SEWING MACHINE DRIVING DEVICE

[75] Inventors: Hiroshi Kumatani; Yutaka Yamaura, both of Aichi, Japan

[73] Assignee: Mitsubishi Denki Kabushiki Kaisha, Tokyo, Japan

[21] Appl. No.: 838,196

[22] Filed: Mar. 7, 1986

Related U.S. Application Data

[63] Continuation of Ser. No. 594,307, Mar. 28, 1984, abandoned.

[30] Foreign Application Priority Data

Mar. 29, 1983 [JP] Japan ............................ 58-45117[U]

[51] Int. Cl.[4] ......................... G05G 1/14; G05G 1/04; F16F 1/06

[52] U.S. Cl. ........................................ 74/512; 74/526; 267/168; 267/175; 267/177

[58] Field of Search ................. 74/561, 513, 526, 565; 267/168, 175, 174, 177

[56] References Cited

U.S. PATENT DOCUMENTS

| | | | |
|---|---|---|---|
| 2,157,588 | 5/1939 | Brewer | 74/526 X |
| 2,850,274 | 9/1958 | Villar | 267/177 X |
| 3,872,739 | 3/1975 | Hudson et al. | 74/513 |

FOREIGN PATENT DOCUMENTS

52/39447 3/1977 Japan .

*Primary Examiner*—Gary L. Smith
*Assistant Examiner*—Vinh Luong
*Attorney, Agent, or Firm*—Bernard, Rothwell & Brown

[57] ABSTRACT

An improved lever mechanism interlocked with a pedal in a sewing machine driving device, which lever mechanism includes a rod positioned on one side portion of a lever so as to act on the lever when the latter is pivoted in one direction from a neutral position, and first and second springs of different diameters disposed concentrically with the above rod so as to urge the rod in the direction opposite to the pivoting direction of the lever.

7 Claims, 3 Drawing Figures

LEVER MECHANISM IN COMBINATION WITH A SEWING MACHINE DRIVING DEVICE

This is a continuation of application Ser. No. 594,307 filed Mar. 28, 1984 now abandoned.

BACKGROUND OF THE INVENTION

1. Field of the Invention

The present invention relates to a lever mechanism in a sewing machine driving device and more particularly to an improvement of a lever mechanism interlocked with a pedal in a sewing machine driving device.

2. Description of the Prior Art

Heretofore, clutch motors have widely been used for driving sewing machines, particularly industrial sewing machines, in which the clutch brake is operated on and off by means of a mechanical lever. Industrial sewing machines provided with such type of a motor are constructed as shown in FIG. 1, in which a sewing machine body 12 is mounted on the upper surface of a sewing machine table 10, while to the lower surface of the table 10 is fixed a clutch motor 14 provided with a control unit 16. To the casing of the control unit 16 is attached a lever 22 which is pivotable about a lever pin 24. The lever 22 is connected to a pedal 20 through a connecting rod 18. To an intermediate portion of the lever 22 is attached a tension spring 26, whereby the lever 22 is pivotally urged in a clockwise direction at all times. Further, a compression spring 27 is attached to the fore end of the lever 22, whereby a counterclockwise pivoting force is imparted to the lever 22. The position of the lever 22 is assumed to be N when the pedal is in a neutral state.

Depression and kick back of the pedal 20 actuate the lever 22 through the connecting rod 18, and the control unit 16 operates in accordance with the movement of the lever 22. More particularly, when the pedal 20 is depressed from the neutral position N to position A and then returned to the neutral position N, the sewing machine stops operating in a lowered position of its needle, that is, with the needle penetrating the cloth.

Next, if the pedal 20 is kicked back from position N conversely to position B, only the cloth presser rises (the cloth becomes rotatable) while the neddle is held in its lowered position. If the pedal 20 is depressed from position B again to N→A position, it becomes possible to effect a high-speed sewing by means of the sewing machine body 12. On the other hand, according to another sequence, if the pedal 20 is further kicked back to position C, the needle of the sewing machine body 12 will go up and stop in its raised position (in which the needle is off the cloth), and subsequently the thread cutting operation is completed. If the pedal is operated to N→C position at a time, the operation in the intermediate B position will not be performed.

Thus, on the kick-back side of the pedal 20 there are two positions, i.e., B and C positions, and therefore the compression spring 28 actually comprises a spring mechanism using two compression springs which are arranged side by side. More particularly, only one compression spring is compressed between N→B positions, while both compression springs are compressed between B→C positions, whereby a clear difference is given in the touch of pedal opeation between N→B and B→C positions.

Such conventional lever mechanism has been disadvantageous in that it requires a large number of components of the spring mechanism between N→B→C positions and is expensive and in that the adjustment of spring pressure must be done through two special bolts. Consequently, the number of parts is increased, the structure becomes complicated and the adjustment of the spring mechanism cannot be done easily.

SUMMARY OF THE INVENTION

It is a primary object of the present invention to provide a useful lever mechanism in a sewing machine driving device in which a level mechanism is free from the above-mentioned drawbacks of the conventional devices.

It is another object of the present invention to provide a lever mechanism in a sewing machine driving device capable of reducing the number of components of a spring mechanism and capable of easily adjusting the spring pressure.

Other and further objects and advantages of the present invention will be more apparent from the following detailed descriptions of an embodiment of the invention taken in connection with the accompanying drawings.

DESCRIPTION OF THE PREFERRED EMBODIMENTS

An embodiment of the present invention will be described hereinunder with reference to the accompanying drawings.

Figure 2:
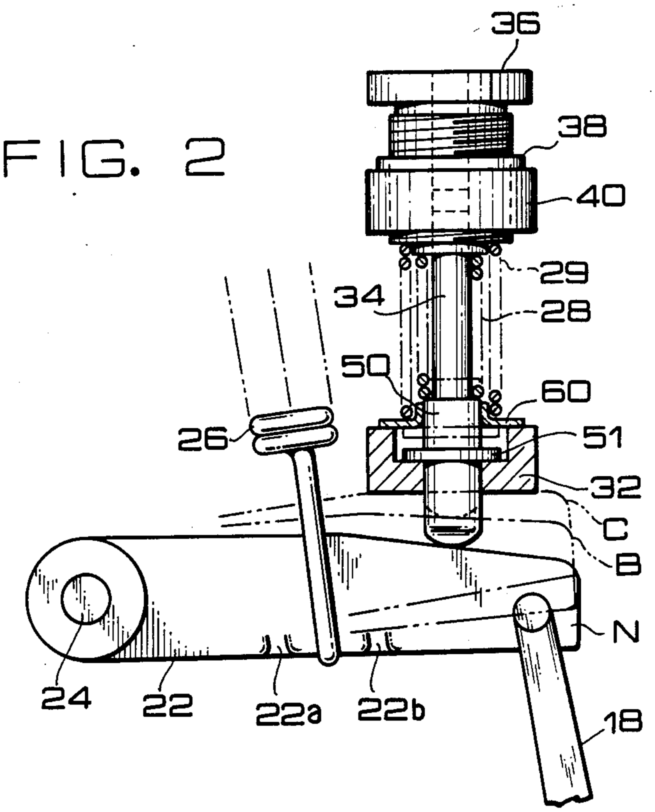
FIG. 2 is a side view of principal components of a lever mechansim according to an embodiment of the present invention.

Referring first to FIG. 2, which is a side view of principal components of a lever mechanism according to an embodiment of the invention, the reference numeral 40 denotes an upper housing formed with a single tapped hole. To this tapped hole are attached one special hollow bolt 36 and one lock nut 38. The special bolt 36 has an inverted convex-shaped lower portion to receive first and second compression springs 28 and 29 of different diameters. Into the hollow portion of the special bolt 36 is inserted the upper end of a rod 34, the lower end of which projects downward from a through hole of a lower housing 32 and is opposed to a side portion of a lever 22.

The rod 34 is formed with a first stepped portion 50, and between this stepped portion and the special bolt 36 is mounted the first compression spring 28. The lever 22 is urged pivotally in a clockwise direction by the biasing force of the compression spring 28. Further, a spring shoe 60 is attached to the first stepped portion 50 of the rod 34 so as to be slidable in the vertical direction, and between this spring shoe 60 and the special bolt 36 is disposed the second compression spring 29. The spring shoe 60 is in contact with the upper portion of the lower housing 32. The rod 34 is further formed with a second stepped portion 51 which is larger than the inside diameter of the spring shoe 60 and which is formed in a position lower than the first stepped portion 50.

The operation of this lever mechanism will now be described. During pivotal movement of the lever 22 from position N to position B in which the second stepped portion 51 of the rod 34 contacts the spring shoe 60, only the pressure of the first compression spring 28 acts on the lever 22 without action thereon of the pressure of the second compression spring 29.

Next, during pivotal movement of the lever 22 from the position B to position C in which the side portion of the lever 22 contacts the lower portion of the lower housing 32, the second stepped portion 51 of the rod 34 pushes up the spring shoe 60. Consequently, the pressure of the first compression spring 28 and that of the second compression spring 29 are applied simultaneously to the lever 22, so that there can be obtained a clear discriminating touch from the position B to the position C.

Figure 1:
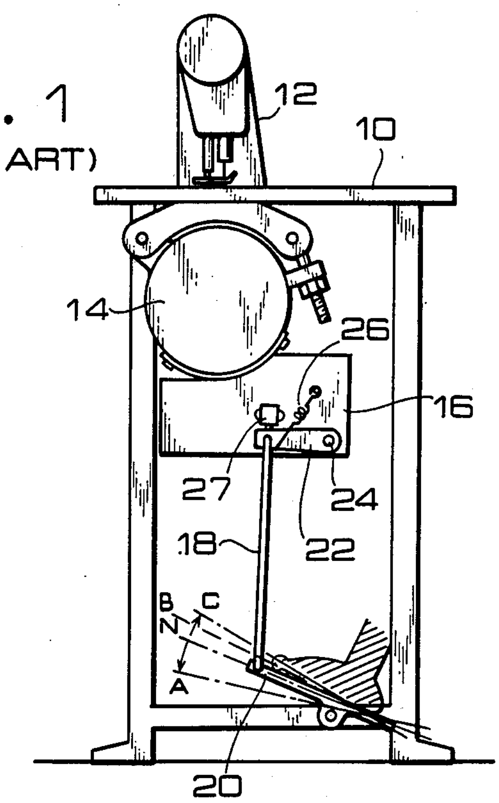
FIG. 1 (PRIOR ART)
FIG. 1 illustrates principal components of a conventional sewing machine.
Figure 3:
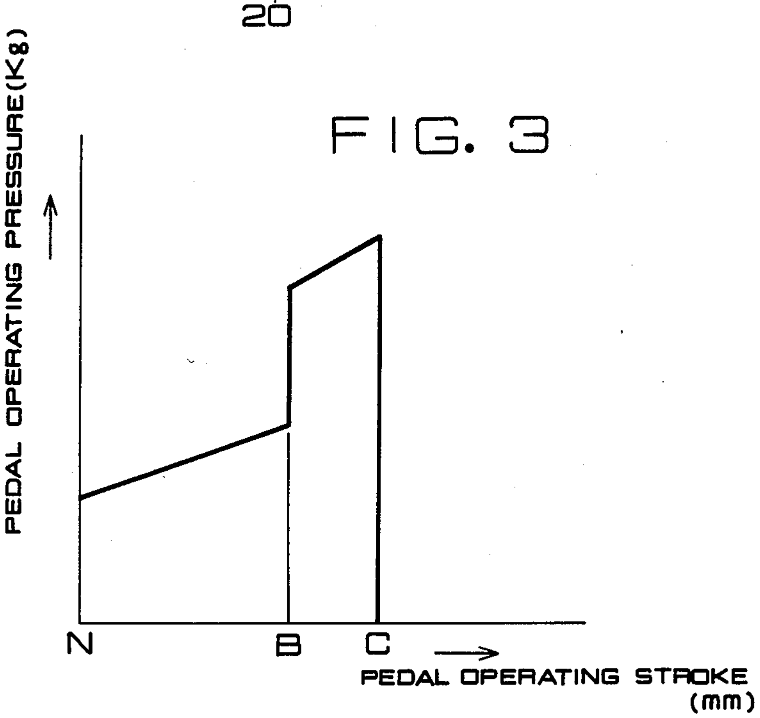
FIG. 3 is a graph showing changes in pedal operating pressure in the embodiment of FIG. 2.

Referring now to FIG. 3, there are shown changes in pedal operating pressure in the use of the lever mechanism of the above embodiment. The adjustment of the spring pressure is effected by turning and thereby vertically moving the special bolt 36 to adjust the length of the first compression spring 28 and that of the second compression spring 29 simultaneously.

According to the present invention, as set forth hereinabove, the discrimination of two positions based on the difference in pedal operating pressure can be attained by a single rod, thus permitting reduction of the number of parts required.

Further, since the pressures of the first and second compression springs can be adjusted by the use of a single special bolt, it is possible to attain a more simplified operation.

What is claimed is:

1. A lever mechanism in combination with a sewing machine device, comprising:

(a) a pivotable lever connected to a sewing machine pedal;

(b) first spring means for biasing said lever in a first direction;

(c) a rod disposed on one side of said lever and movable by said lever when said lever is moved in said first direction from a neutral position;

(d) a first spring and a second spring having different diameters, said first and second springs being disposed concentrically about said rod, said first and second springs being arranged to exert a biasing force on said lever in a second direction opposite to said first direction;

(e) said rod having spaced first and second shoulders thereon;

(f) one end of said first spring engaging said first shoulder;

(g) one end of said second spring being positively spaced from said second shoulder when said lever is in its neutral position but being disposed to apply biasing force to said lever after a predetermined movement of said lever in said first direction; and (h) means engaging the other ends of said first and second springs for simultaneously adjusting the biasing force exerted by said first and second springs without affecting the neutral position of said lever.

2. A lever mechanism in combination with a sewing machine device, comprising:

(a) a pivotable lever connected to a sewing machine pedal;

(b) first spring means for biasing said lever in a first direction;

(c) a first fixed member and a second fixed member spaced from said first fixed member;

(d) a rod extending between said fixed members and supported thereby, said rod being disposed on one side of said lever and movable by said lever when said lever is moved in said first direction from a neutral position;

(e) said rod having spaced first and second shoulders thereon;

(f) a first spring and a second spring having different diameters, said first and second springs being disposed concentrically about said rod, said first and second springs being arranged to exert a biasing force in a second direction opposite to said first direction;

(g) one end of said first spring and one end of said second spring being disposed in engagement with said first fixed member, the other end of said first spring engaging said first shoulder, the other end of said second spring being positively spaced from said second shoulder when said lever is in its neutral position and being disposed for exerting a biasing force on said second shoulder when said lever has moved a predetermined distance in said first direction from the neutral position of said lever; and (h) said first fixed member including means engaging said one end of said first and second springs for simultaneously adjusting the biasing force exerted by said first and second springs without affecting the neutral position of said lever.

3. The lever mechanism of claim 2 wherein said second fixed member includes a hole and said rod extends through said hole for engagement with said lever.

4. The lever mechanism of claim 2 wherein:

(a) said second fixed member has a recess therein on the side facing said first and second springs, and said second shoulder is received in said recess.

5. The lever mechanism of claim 2 wherein:

(a) said first fixed member has a threaded hole therein; and (b) said means for adjusting the biasing force of said springs comprises a threaded member rotatably engaging said threaded hole.

6. The lever mechanism of claim 2 wherein said first means for biasing said lever is a tension spring and said first and second springs are compression springs.

7. A lever mechanism in a sewing machine device, comprising:

(a) a pivotable lever connected to a sewing machine pedal;

(b) first means for biasing said lever in a first direction;

(c) a first fixed member and a second fixed member spaced from said first fixed member;

(d) a rod extending between said fixed members and supported thereby, said rod being disposed on one side of said lever and movable by said lever when said lever is moved in said first direction from a neutral position;

(e) said rod having spaced first and second shoulders thereon;

(f) a first spring and a second spring having different diameters, said first and second springs being disposed concentrically about said rod, said first and second springs being arranged to exert a biasing force in a second direction opposite to said first direction;

(g) one end of said first spring and one end of said second spring being disposed in engagement with said first fixed member, the other end of said first spring engaging said first shoulder, the other end of said second spring being spaced from said second shoulder when said lever is in its neutral position and being disposed for exerting a biasing force on said second shoulder when said lever has moved a predetermined distance in said first direction from the neutral position of said lever; and (h) said first member including means engaging said one end of said first and second springs for simultaneously adjusting the biasing force exerted by said first and second springs without affecting the neutral position of said lever;

(i) said second fixed member having a recess therein on the side facing said first and second springs, and said second shoulder being received in said recess;

(j) a shoe slidably positioned on said rod above said recess;

(k) said other end of said second spring engaging said shoe; and (l) said second shoulder engaging said shoe after said lever has moved a predetermined distance in said first direction from the neutral position of said lever, whereby further movement of said lever in said first direction is against the biasing force of both said first and second springs.

* * * * *